US008843566B2

(12) United States Patent
Thompson (10) Patent No.: US 8,843,566 B2
(45) Date of Patent: Sep. 23, 2014

(54) SECURING OUTBOUND MAIL

(75) Inventor: Ray Thompson, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 825 days.

(21) Appl. No.: 12/194,733

(22) Filed: Aug. 20, 2008

(65) Prior Publication Data

US 2010/0049807 A1    Feb. 25, 2010

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 12/585* (2013.01); *H04L 51/12* (2013.01)
USPC ...................................................... 709/206

(58) Field of Classification Search
USPC ...................................................... 709/206
See application file for complete search history.

(56) References Cited

U.S. PATENT DOCUMENTS

| | | | | |
|---|---|---|---|---|
| 7,051,001 | B1 * | 5/2006 | Slater ............................... | 705/39 |
| 7,120,671 | B2 * | 10/2006 | Gusler et al. ................... | 709/206 |
| 7,251,656 | B2 * | 7/2007 | Keown et al. ..................... | 1/1 |
| 2004/0078334 | A1 * | 4/2004 | Malcolm et al. ................. | 705/50 |
| 2004/0199596 | A1 * | 10/2004 | Nutkis ........................... | 709/207 |
| 2005/0138109 | A1 * | 6/2005 | Redlich et al. ................. | 709/201 |
| 2005/0273600 | A1 * | 12/2005 | Seeman ......................... | 713/160 |
| 2006/0036690 | A1 * | 2/2006 | O—Neil ......................... | 709/206 |
| 2006/0075228 | A1 * | 4/2006 | Black et al. ................... | 713/167 |
| 2007/0061567 | A1 * | 3/2007 | Day et al. ...................... | 713/159 |
| 2007/0067394 | A1 * | 3/2007 | Adams et al. ................... | 709/206 |
| 2007/0233789 | A1 * | 10/2007 | Agarwal et al. ............... | 709/206 |
| 2007/0233790 | A1 * | 10/2007 | Agarwal et al. ............... | 709/206 |
| 2008/0172717 | A1 * | 7/2008 | Malcolm ............................ | 726/1 |
| 2008/0282347 | A1 * | 11/2008 | Dadhia et al. .................... | 726/22 |
| 2008/0301297 | A1 * | 12/2008 | Malcolm et al. ............... | 709/225 |
| 2008/0301454 | A1 * | 12/2008 | Malcolm et al. ............... | 713/176 |
| 2009/0019121 | A1 * | 1/2009 | Mears ............................ | 709/206 |
| 2009/0232300 | A1 * | 9/2009 | Zucker et al. ...................... | 380/2 |

OTHER PUBLICATIONS

"Secret Sweeper Version 2.1", Mimesweeper policy-based content security for encrypted email, 6 pages, obtained online on Jul. 30, 2008 at http://www.mimesweeper.com.
"SurfControl E-Mail Filtering Solutions", obtained online on Jul. 30, 2008 at http://www.surfcontrol.com/Default.aspx?id=357, 1 page.
"Barracuda Networks Adds Outbound Email Protection to Entire Barracuda Spam Firewall Line", obtained online on Jul. 30, 2008 at http://barracudanetworks.com/ns/news_and_events/index.php?nid=52, 2 pages.

* cited by examiner

*Primary Examiner* — Alicia Baturay
(74) *Attorney, Agent, or Firm* — Kilpatrick Townsend & Stockton LLP (57) ABSTRACT

Methods, systems, and machine-readable media are disclosed for client-based filtering of email content. According to one embodiment, a method for providing client-based filtering of email content can comprise detecting an outbound email with a filter implemented on an email client application. A determination can be made with the filter whether the outbound email is addressed to a recipient outside of an organization. In response to determining the outbound email is addressed to a recipient outside of the organization, a determination can be made with the filter whether to allow the email to be sent. Determining whether to allow the email to be sent can comprise scanning the content of the email, and/or any attachments, and determining whether the content of the email contains protected information.

23 Claims, 9 Drawing Sheets

SECURING OUTBOUND MAIL

BACKGROUND OF THE INVENTION

Embodiments of the present invention generally relate to financial transactions. More specifically, embodiments of the present invention relate to methods and systems for utilizing available product information during a financial transaction.

Various types of filters to block or prevent unsolicited and/or unwanted emails (commonly referred to as "spam") from reaching a recipient's email inbox are well-known and widely used. These filters typically scan the contents and/or headers of an incoming email for keywords, patterns, attachments, sources, addresses, etc. for information indicative of an unsolicited email. If an email is judged by the filter to be spam, the email is not delivered to the recipient's inbox. In some cases, the email may be directed to an alternative destination such as a specially designated folder.

Filtering of outgoing email is also sometimes performed. For example, outgoing email can be filtered to prevent the origination or propagation of spam or to prevent the dissemination of certain information. As with filters on incoming email, a filter on outgoing email can scan the contents and/or headers of an outgoing email for keywords, patterns, attachments, source addresses, etc. for information meeting certain predefined criteria. Such filters are implemented on a mail server supporting multiple clients. In this way, a common set of criteria can be applied to multiple clients, e.g., those clients within a company or organization.

However, such server-based outgoing email filters have some limitations and disadvantages. For example, depending upon the implementation, license for the software, etc., such approaches can be costly and/or cumbersome to manage. Also, such filters may not be useful to all organizations. For example, a loosely organized or informal organization may not use a mail server. Rather, such an organization may rely on a collection of individuals using individual email clients that do not send and receive email through the same servers. Therefore, a server-based filter cannot operate across these individual clients. Hence, there is a need in the art for improved methods and systems for securing outbound email.

BRIEF SUMMARY OF THE INVENTION

Methods, systems, and machine-readable media are disclosed for client-based filtering of email content. According to one embodiment, a method for providing client-based filtering of email content can comprise detecting an outbound email with a filter implemented on an email client application. A determination can be made with the filter whether the outbound email is addressed to a recipient outside of an organization. In response to determining the outbound email is addressed to a recipient outside of the organization, a determination can be made with the filter whether to allow the email to be sent. Determining whether to allow the email to be sent can comprise scanning the content of the email, and/or any attachments, and determining whether the content of the email contains protected information.

In response to determining the email contains protected information, a determination can be made as to whether the recipient is eligible to receive the protected information. In response to determining the recipient is not eligible to receive the protected information, the email can be blocked with the filter. If the recipient is eligible to receive the protected information, a determination can be made as to whether encryption of the protected information is required. In response to determining encryption of the protected information is required, a determination can be made as to whether the protected information is encrypted. If the protected information is not encrypted, the email can be blocked with the filter.

In response to determining to not allow the email to be sent, any of a variety of one or more actions can be performed. For example, a notification that the email cannot be sent can be provided. Such a notification can explain reasons for determining to not allow the email to be sent. Additionally or alternatively, in response to determining to not allow the email to be sent, information related to the email can be logged for later reference. Additionally or alternatively, in response to determining to not allow the email to be sent, information related to the email can be reported, e.g., to a compliance department or officer.

According to another embodiment, a system can comprise a processor executing an email client application and a memory coupled with and readable by the processor. The memory can have stored therein instructions comprising an email filter which, when executed by the processor, cause the processor to detect an outbound email of the email client application, determine whether the outbound email is addressed to a recipient outside of an organization, and in response to determining the outbound email is addressed to a recipient outside of the organization, determine whether to allow the email to be sent. Determining whether to allow the email to be sent can comprise scanning the content of the email, and/or any attachments, and determining whether the content of the email contains protected information.

In response to determining the email contains protected information, a determination can be made as to whether the recipient is eligible to receive the protected information. In response to determining the recipient is not eligible to receive the protected information, the email can be blocked with the filter. If the recipient is eligible to receive the protected information, a determination can be made as to whether encryption of the protected information is required. In response to determining encryption of the protected information is required, a determination can be made as to whether the protected information is encrypted. If the protected information is not encrypted, the email can be blocked with the filter.

In response to determining to not allow the email to be sent, any of a variety of one or more actions can be performed. For example, a notification that the email cannot be sent can be provided. Such a notification can explain reasons for determining to not allow the email to be sent. Additionally or alternatively, in response to determining to not allow the email to be sent, information related to the email can be logged for later reference. Additionally or alternatively, in response to determining to not allow the email to be sent, information related to the email can be reported, e.g., to a compliance department or officer.

According to yet another embodiment, a machine-readable medium can have stored thereon a series of instructions which, when executed by a processor, cause the processor to provide client-based filtering of email content by detecting an outbound email with a filter implemented on an email client application, determining with the filter whether the outbound email is addressed to a recipient outside of an organization, and in response to determining the outbound email is addressed to a recipient outside of the organization, determining with the filter whether to allow the email to be sent.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for providing client-based filtering of outgoing email content. Generally speaking, such a filter can be implemented on an individual client, independent of a mail server, and can filter outgoing email messages to prevent the unintended, unauthorized, or inappropriate transmission of confidential or other protected information. More specifically, providing client-based filtering of email content can comprise detecting an outbound email with a filter implemented on an email client application. A determination can be made with the filter whether the outbound email is addressed to a recipient outside of an organization. In response to determining the outbound email is addressed to a recipient outside of the organization, a determination can be made with the filter whether to allow the email to be sent. Determining whether to allow the email to be sent can comprise scanning the content of the email, and/or any attachments, and determining whether the content of the email contains protected information. Additional details of various embodiments of the present invention will be described below with reference to the figures.

Figure 1:
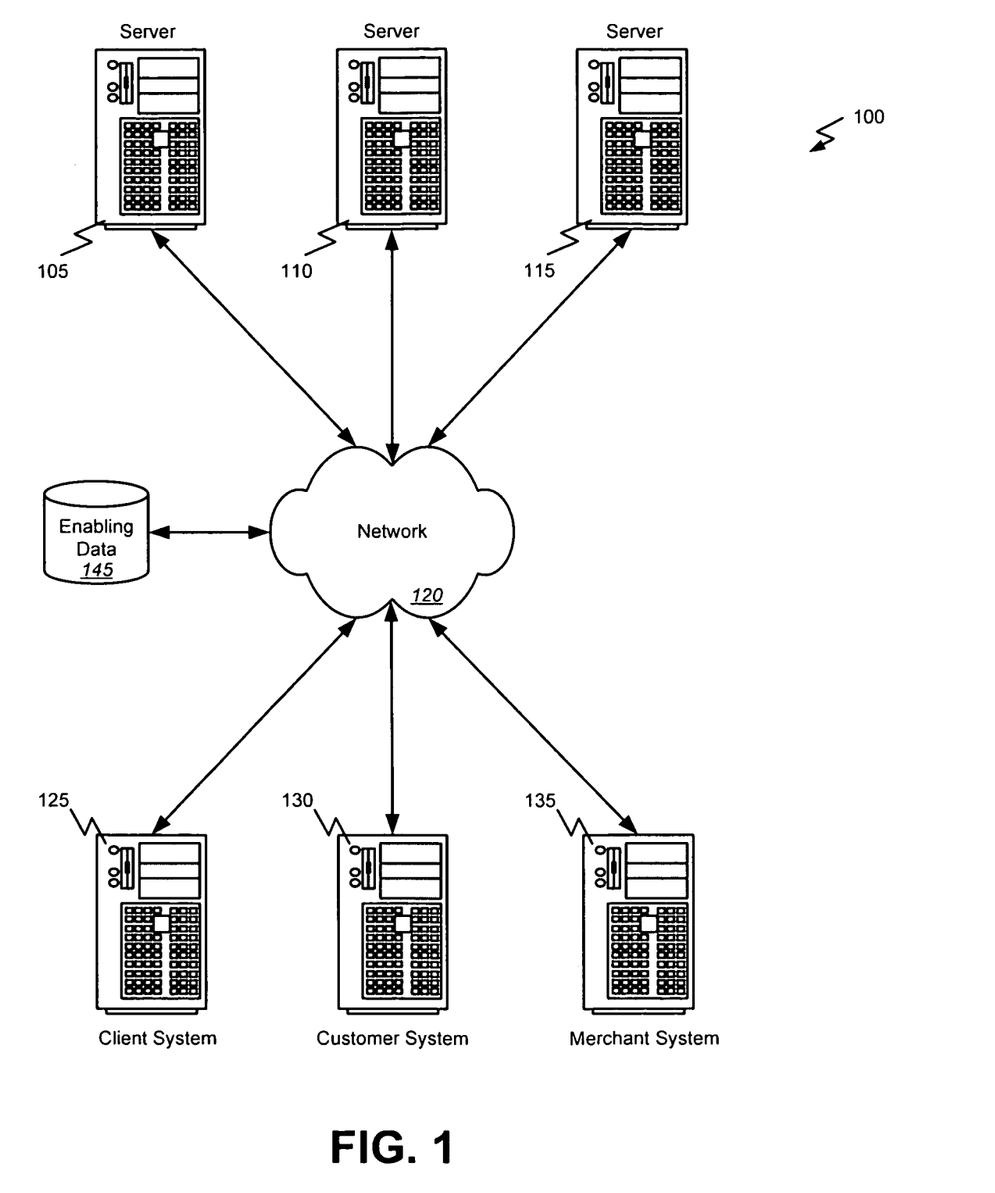
FIG. 1 is a block diagram illustrating an exemplary environment in which embodiments of the present invention may be implemented.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g. 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc The applications can also include any number of applications for controlling access to resources of the servers 105, 110, 115.

In some embodiments, the system 100 may also include a network 120. The network may can be any type of network familiar to those skilled in the art that can support data communications using any of a variety of commercially-available protocols, including without limitation TCP/IP, SNA, IPX, AppleTalk, and the like. Merely by way of example, the network 120 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc. For example, the repository of enabling data 145 can include account numbers, social security numbers, or any of a variety of other potentially secret, privileged, or confidential information that can be protected according to the various embodiments described herein.

Figure 2:
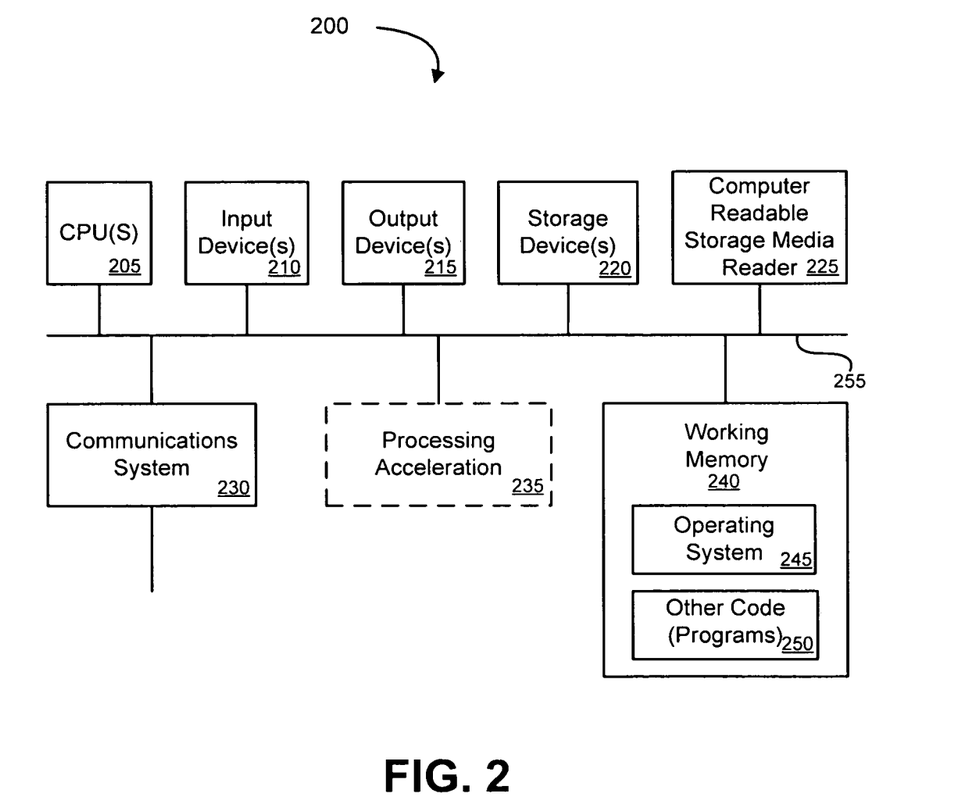
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device(s) 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
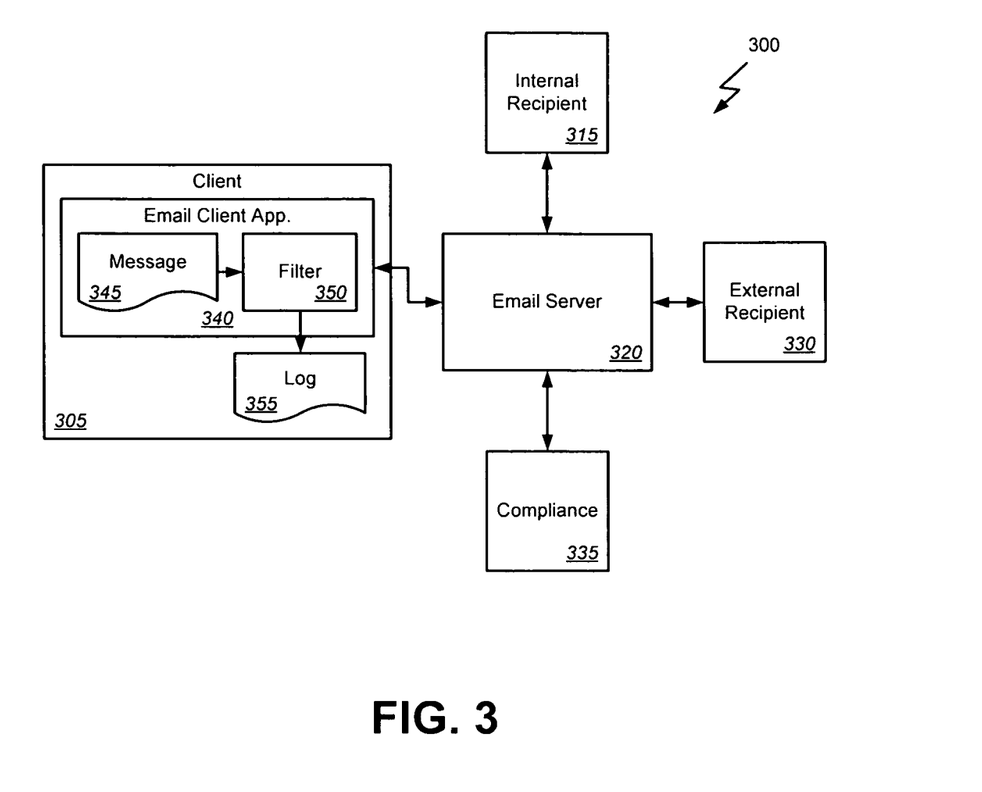
FIG. 3 is block diagram illustrating additional details of a system for client-based filtering of email content according to one embodiment of the present invention.

FIG. 3 is block diagram illustrating additional details of a system for client-based filtering of email content according to one embodiment of the present invention. As illustrated here, the system 300 can include a client 305 such as a personal computer, workstation, etc. as described above communicatively coupled with an email server 320 such as a POP3 and/or SMTP server as known in the art. The client 305 can be coupled with the email server via a network (not shown here) such as any wired or wireless LAN, WAN, or other network as described above. The system 300 can also include one or more recipients systems, i.e., other client systems. The recipients can also be coupled with the email sever 320 via a network (not shown here) as described above and can include one or more internal recipients 315 and/or one or more external recipients 330. As used herein, an external recipient 330 is considered to be a recipient outside of a certain organization and/or an entity that is not presumed to be allowed to access certain confidential and/or protected information of or available to the organization. Conversely, an internal recipient 315 can be considered to be a recipient inside of the organization and/or an entity that is presumed to be allowed to access the protected information. For example, an internal recipient can be an employee of a business or member of an organization. In another example, an internal recipient may be a member of a particular group of users within a larger organization, e.g., member of a management group of particular business unit, etc.

The client 305 can include an email client application 340. The email client application 340 can comprise any such application as known in the art including but not limited to Microsoft Outlook or Outlook Express. As known in the art, the email client application 340 can be used to generate and send an email message 345 via the email server 320. According to one embodiment, the client 305 may also include a filter 350. While illustrated here as part of the email client application 340, it should be understood that the filter 350 can comprise an add-on application or a separate, stand-alone application of the client 305 depending upon the exact implementation. According to one embodiment, the filter 350 can comprise a set of macro instructions or a script file executable with or by the email client application 340.

In use, the filter 350 can detect an outbound email message 345 of the email client application 340, determine whether the outbound email message 345 is addressed to a recipient outside of an organization, such as external recipient 330, and in response to determining the outbound email is addressed to a recipient outside of the organization, determine whether to allow the email message 345 to be sent. For example, determining whether the email message 345 is addressed to an external recipient 330 can be based on a domain or other address information from the header portion of the message 345. In other cases, the determination may be based on a list of recipients. For example, the filter 350 may maintain or access a list (not shown here) of recipients defined as internal recipients. If a particular addressee of a message 345 is not on the list of defined internal recipients, that addressee can be assumed to be an external recipient.

Once the filter 350 has determined whether an addressee is internal or external, the filter 350 can determine whether to allow the email message 345 to be sent. For example, the filter can scan the content of the email, and/or any attachments, and determining whether the content of the email message 345 contains protected information. Determining whether the content of the email message 345 contains protected information can be accomplished by searching for keywords, comparing the contents to known formats or structures related to protected information, or based on other criteria. Such keywords can be hard-coded into the filter 350 and/or may be defined in one or more files within or accessible by the filter 350.

According to one embodiment, business elements that are considered to be sensitive in nature and in need of protection can be identified and a series of rules can be defined for use by the filter 350 to isolate and differentiate the values that comprise such data. For example, in the case of financial information rules can be defined for identifying strings within an email indicating a Personal Account Number (PAN), Social Security Number (SSN), Bank Number (BN), or Routing Transit number (RT). Rules for identifying a PAN can include but are not limited to rules defining: (1) minimum and maximum lengths of the string of digits; (2) inclusion/exclusion of specific formatting characters; (3) existence of specific beginning digits; (4) exclusion of specific strings of repeating digits; and/or (5) passage of an industry standard routine, e.g., Base 10 Check Digit routine. For example, PAN 4444-3333-2222-1111 meets the criteria mentioned above: (1) the length of the string of digits (16) falls within the minimum and maximum length constraints (12 and 19 respectively); (2) a hyphen (-) is an allowable separation character; (3) a "4" is an allowable beginning digit; (4) it does not have an ineligible string of repeating digits; (5) and it passes a Base 10 Check Digit routine.

Additionally or alternatively, rules for identifying an SSN include but are not limited to: (1) exact lengths of the string of digits; (2) inclusion/exclusion of specific formatting characters; (3) passage of a test for the first three digits (known as the "Area") against the US Government's pattern of issued numbers; (4) passage of a test for the middle two digits (known as the "Group") against the US Government's pattern for issued numbers and their sequence; and/or (5) passage of a test for the final four digits (known as the "Serial") against the pattern for issued numbers. For example, SSN 485-94-xxxx meets the criteria mentioned above: (1) the length of the string of digits (9) matches the required length (9); (2) a hyphen (-) is an allowable separation character; (3) an Area of "485" has been used by the US government in distributing SSNs; (4) a Group of "94" has been used by the US Government in distributed SSNs; (5) and a Serial Number of "xxxx" is a valid Serial Number.

As noted above, other rules can additionally or alternatively be defined for use by the filter 350. Such additional or alternative rules can include but are not limited to rules for identifying a BN and/or RT. Rules for identifying a BN and RT can include but are not limited to: (1) exact lengths of the string of digits; (2) and look-up of a database table of BN and RT numbers stored in a relational database. In implementations involving the use and/or protection of other types of data, other rules may additionally or alternatively be defined. For example, in a health care setting, a patient's SSN may be identified by rules such as described above. Additionally or alternatively, other patient information can be identified based on any of a variety of rules for identifying such information based on format, content, etc. Such implementations and others are contemplated and considered to be within the scope of the present invention.

In response to determining the email message 345 contains protected information, the filter 350 can determine whether the recipient is eligible to receive the protected information. Determining whether the recipient is eligible to receive the message 345 can be based on a domain or other address information from the header portion of the message 345. In other cases, the determination may be based on a list of recipients. For example, the filter 350 may maintain or access a list (not shown here) of recipients defined as eligible or approved recipients of protected information. If a particular addressee of a message 345 is not on the list of approved recipients, that addressee can be assumed to be ineligible.

In response to determining the recipient is not eligible to receive the protected information, the email message 345 can be blocked by the filter 350. If the recipient is eligible to receive the protected information, the filter 350 can further determine whether encryption of the protected information is required. This determination can be based on policies defined by the filter 350 and/or one or more external policies (not shown here) that may be read or accessed by the filter 350. In response to determining encryption of the protected information is required, the filter can then determine whether the protected information is actually encrypted. If the protected information is not encrypted, the email message 345 can be blocked by the filter 350.

In response to determining to not allow the email message 345 to be sent, any of a variety of one or more actions can be performed. For example, a notification that the email cannot be sent can be provided to the sender, e.g., as a pop-up or other message through the interface of the email client application or as a return or error message email. Such a notification can explain reasons for determining to not allow the email to be sent, e.g., unapproved external recipient, unencrypted content, etc. Additionally or alternatively, in response to determining to not allow the email to be sent, information related to the email message 345 can be logged 355 for later reference. The information in the log 355 can comprise information explaining reasons for determining to not allow the email to be sent, e.g., unapproved external recipient, unencrypted content, etc. Additionally or alternatively, in response to determining to not allow the email message 345 to be sent, information related to the email message 345 can be reported to a compliance recipient 335, e.g., to a compliance department or officer. Such a report can be made in the form of an email notification which may include the log 355 or other information related to the message 345, the originating client 305, the recipient, etc.

Figure 4:
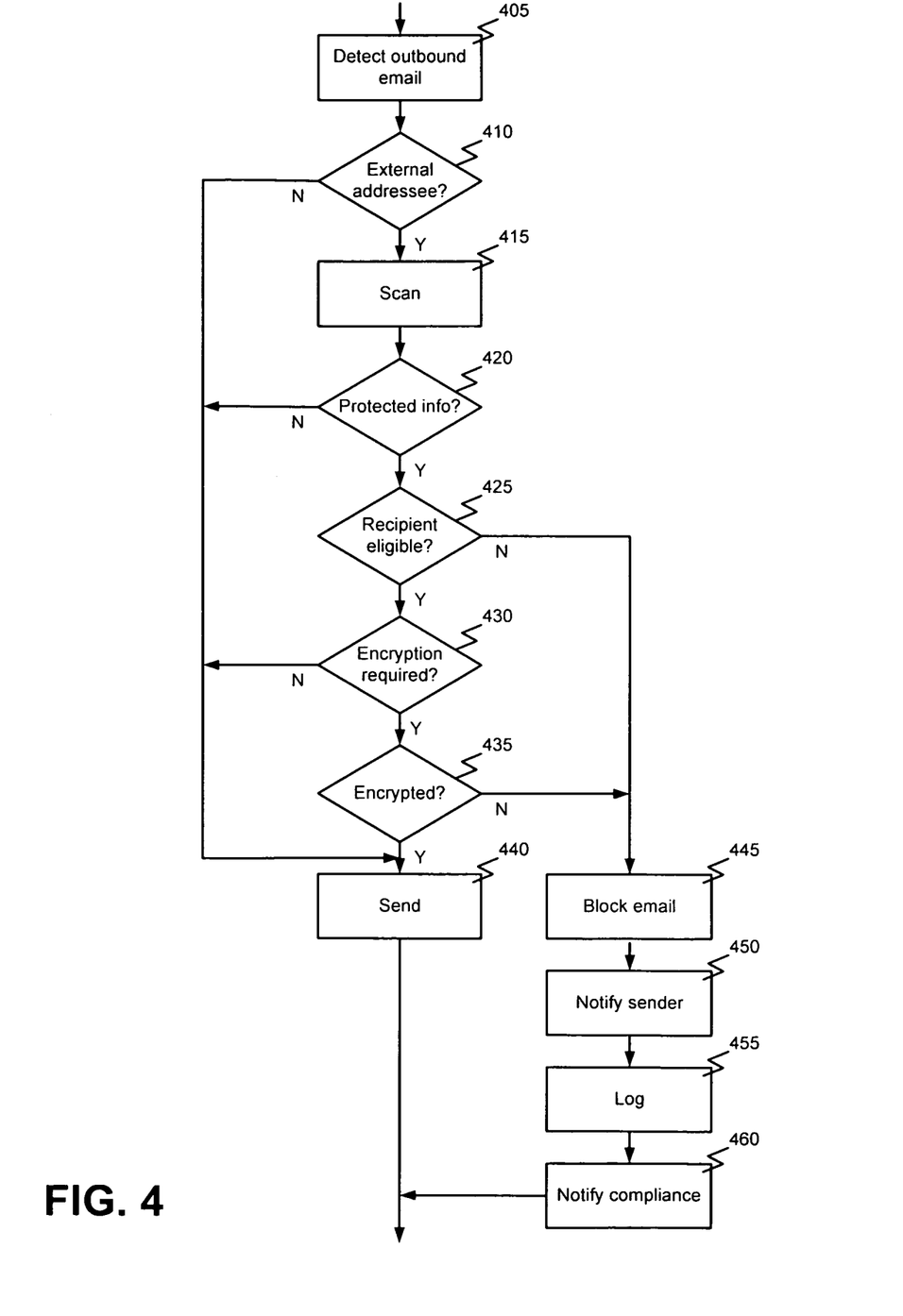
FIG. 4 is a flowchart illustrating a process for client-based filtering of email content according to one embodiment of the present invention.

FIG. 4 is a flowchart illustrating a process for client-based filtering of email content according to one embodiment of the present invention. More specifically, this example illustrates process as may be performed by a filter of or for use with an email client application in the context described above. In this example, the process begins with detecting 405 an outbound email with a filter implemented on an email client application. A determination 410 can be made with the filter whether the outbound email is addressed to a recipient outside of an organization. If 410 the message is addressed to an internal recipient, the message can be sent 440 without further filtering.

In response to determining 410 the outbound email is addressed to a recipient outside of the organization, determinations 420-435 can be made with the filter whether to allow the email to be sent, i.e., the message can be further filtered. This further filtering can comprise scanning 415 the content of the email, and/or any attachments, and determining 420 whether the content of the email contains protected information. If 420 the email does not contain confidential or protected information, the message can be sent 440 without further filtering.

In response to determining 420 the email contains protected information, a determination 425 can be made as to whether the recipient is eligible to receive the protected information. In response to determining 425 the recipient is not eligible to receive the protected information, the email can be blocked 445 with the filter.

If 425 the recipient is eligible to receive the protected information, a determination 430 can be made as to whether encryption of the protected information is required. In response to determining 430 that encryption is not required, the message can be sent 440. In response to determining 430 encryption of the protected information is required, a determination 435 can be made as to whether the protected information is encrypted. If 435 the protected information is not encrypted, the email can be blocked 445 with the filter. In response to determining 435 that the content is properly encrypted, the message can be sent 440.

In response to not allowing the email to be sent, i.e., after blocking 445 an email based on a determination 425 that a recipient is not eligible to receive the information, a determination that the content is not properly encrypted, etc., any of a variety of one or more actions 450-460 can be performed. For example, a notification that the email cannot be sent 450 to the sender or originator of the message. Such a notification can explain reasons for determining to not allow the email to be sent. Additionally or alternatively, in response to determining to not allow the email to be sent, information related to the email can be logged 455 for later reference. Additionally or alternatively, in response to determining to not allow the email to be sent, information related to the email can be reported 460, e.g., to a compliance department or officer.

FIGS. 5-13 represent exemplary user interfaces that may be provided by or used with embodiments of the present invention. For example, such interfaces may be provided by or used with the filter described above. These exemplary user interfaces are described for illustrative purposes only. Such interfaces are provided by way of example only and are not intended to limit the scope of the present invention. It should be understood that in various other implementations, the interface(s) provided by various embodiments can vary significantly without departing from the scope of the present invention.

Figure 5:
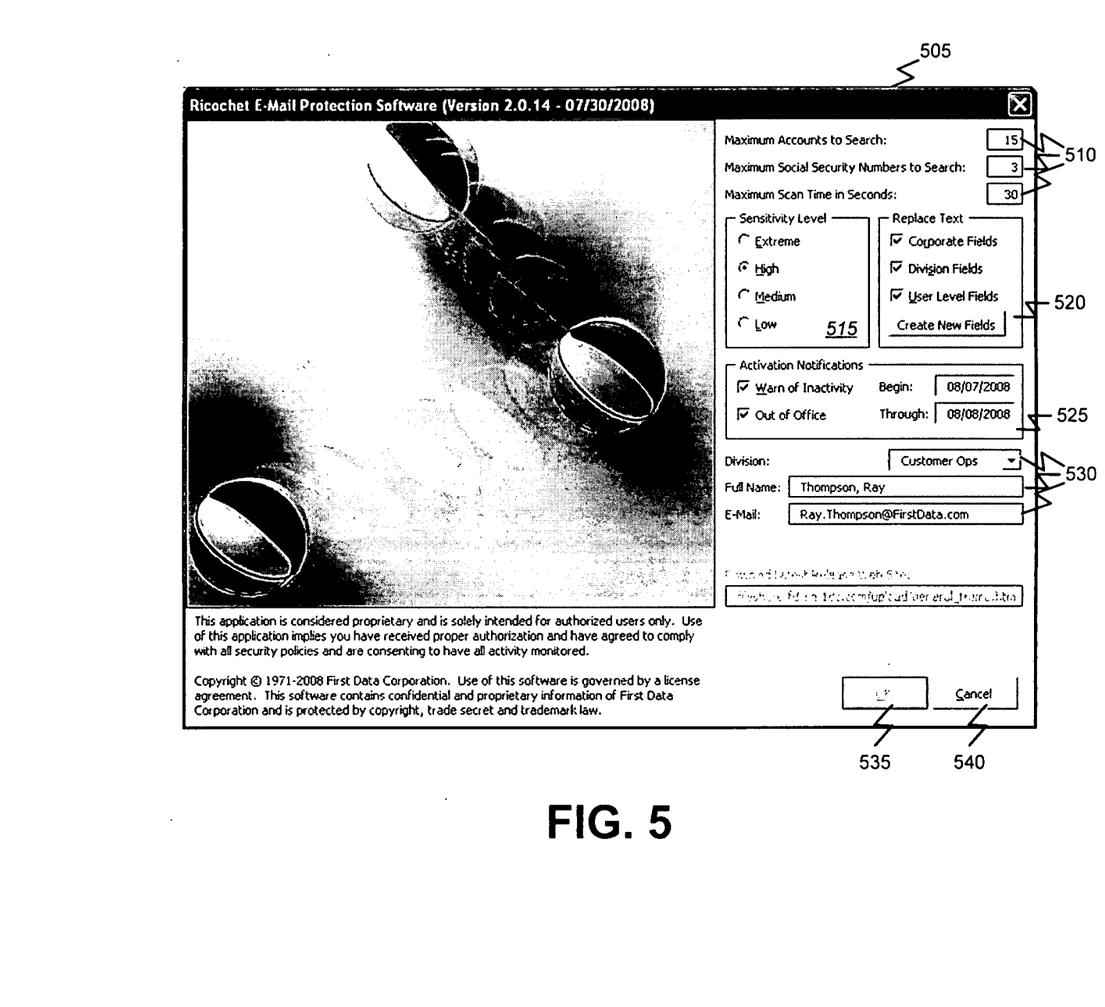
FIG. 5 illustrates an exemplary user interface for configuring client-based filtering of email content according to one embodiment of the present invention.

FIG. 5 illustrates an exemplary user interface for configuring client-based filtering of email content according to one embodiment of the present invention. In this example, the interface comprises a dialog box 505 or window in which is displayed a number of elements for configuring the filtering of outbound email messages. For example, the elements can include textboxes 510 for setting to indicating maximum limits for searching an email message, e.g., stop searching after finding a specified number or amount of sensitive information or after a specified time. The dialog box 505 can also include a set of radio buttons 515 or other elements for specifying a level of security. For example, based on the level of security, the maximum limits for searching email messages may change by default, a different or additional set of rules may be applied by the filter, etc. The dialog box 505 can additionally or alternatively include a set of checkboxes 520 or other elements indicating text to be automatically replaced when identified in an email message, i.e., when protected information is identified. The dialog box 505 can include a set of elements 525 such as checkboxes and/or text boxes for setting activation notifications for providing warnings of or notifications of activity or inactivity during specific periods. Additionally or alternatively, the dialog box 505 can include a set of textboxes 530, combo boxes or other elements for setting or specifying identifying information for a user associated with the email client application. The dialog box 505 can also include a button 535 or other element for confirming the configuration settings and/or a button 540 for canceling the configuration process.

Figure 6:
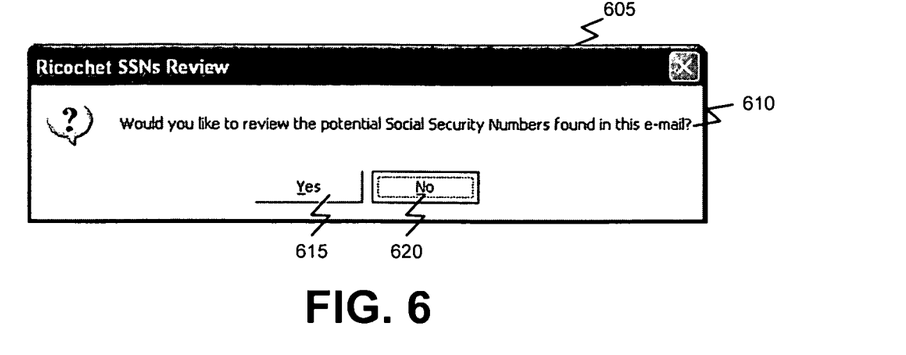
FIG. 6 illustrates an exemplary user interface for providing a warning of protected content in an email according to one embodiment of the present invention.

FIG. 6 illustrates an exemplary user interface for providing a warning of protected content in an email according to one embodiment of the present invention. In this example, the interface comprises dialog box 605 or other element that can be presented, for example, as a pop-up window or other graphical display element when the filter identifies protected information in an outbound email message, in this example a SSN. The dialog box 605 can include a message 610 indicating that protected information has been identified and providing the user with an option to review the identified information. The dialog box 605 can also include a button 615 or other element for accepting the option to review the information and/or a button 620 or other element for declining the option.

Figure 7:
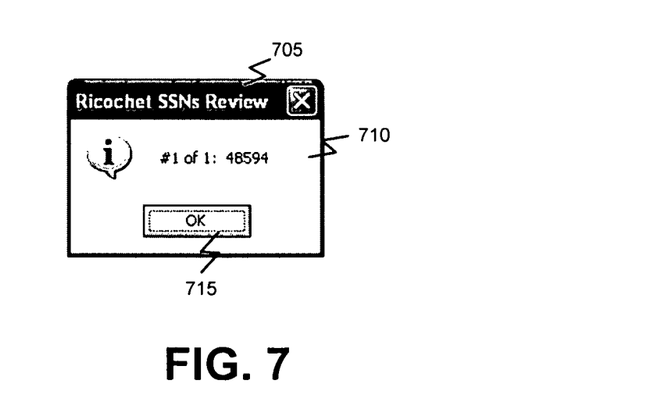
FIG. 7 illustrates an exemplary user interface for providing details of protected content in an email according to one embodiment of the present invention.

FIG. 7 illustrates an exemplary user interface for providing details of protected content in an email according to one embodiment of the present invention. In this example, the interface comprises dialog box 705 or other element that can be presented, for example, as a pop-up window or other graphical display element when the user elects to review the identified information, e.g., presses the "OK" button 715. As illustrated here, the dialog box 705 can include a message 710 indicating the information identified and a button 715 or other element for acknowledging the information and possibly advancing to another, next identified piece of information, if more than one is found.

Figure 8:
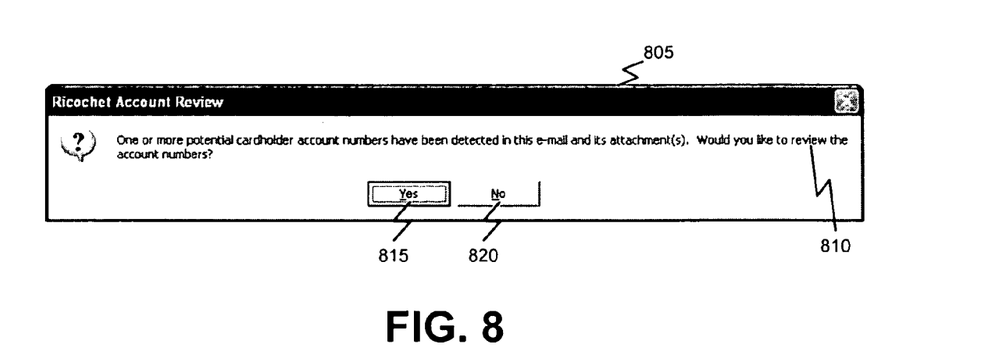
FIG. 8 illustrates an exemplary user interface for providing a warning of protected content in an email according to an alternative embodiment of the present invention.

FIG. 8 illustrates an exemplary user interface for providing a warning of protected content in an email according to an alternative embodiment of the present invention. In this example, the interface comprises dialog box 805 or other element that can be presented, for example, as a pop-up window or other graphical display element when the filter identifies protected information in an outbound email message, in this example an account number. The dialog box 805 can include a message 810 indicating that protected information has been identified and providing the user with an option to review the identified information. The dialog box 805 can also include a button 815 or other element for accepting the option to review the information and/or a button 820 or other element for declining the option.

Figure 9:
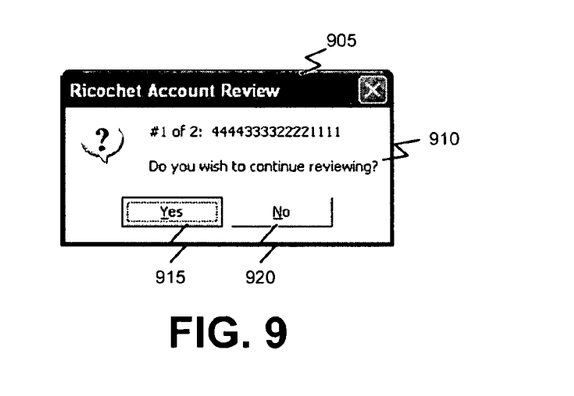
FIG. 9 illustrates an exemplary user interface for providing details of protected content in an email according to an alternative embodiment of the present invention.

FIG. 9 illustrates an exemplary user interface for providing details of protected content in an email according to an alternative embodiment of the present invention. In this example, the interface comprises dialog box 905 or other element that can be presented, for example, as a pop-up window or other graphical display element when the user elects to review the identified information, e.g., presses the "Yes" button 915. As illustrated here, the dialog box 905 can include a message 910 indicating the information identified and perhaps presenting an option to continue reviewing identified information. The dialog box 905 can also include a button 915 or other element for acknowledging the information and possibly advancing to another, next identified piece of information, if more than one is found and/or a button 920 or other element for ending or canceling the review.

Figure 10:
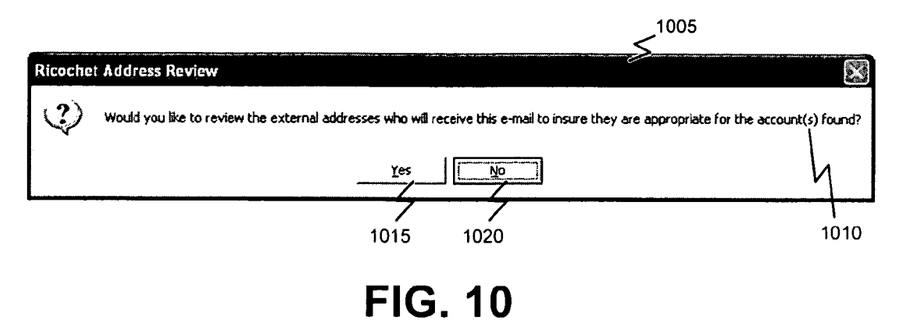
FIG. 10 illustrates an exemplary user interface for reviewing recipient addresses of an email according to one embodiment of the present invention.

FIG. 10 illustrates an exemplary user interface for reviewing recipient addresses of an email according to one embodiment of the present invention. In this example, the interface comprises dialog box 1005 or other element that can be presented, for example, as a pop-up window or other graphical display element when the filter identifies external recipients. The dialog box 1005 can include a message 1010 indicating that external recipients have been identified and providing the user with an option to review the identified recipient information. The dialog box 1005 can also include a button 1015 or other element for accepting the option to review the information and/or a button 1020 or other element for declining the option.

Figure 11:
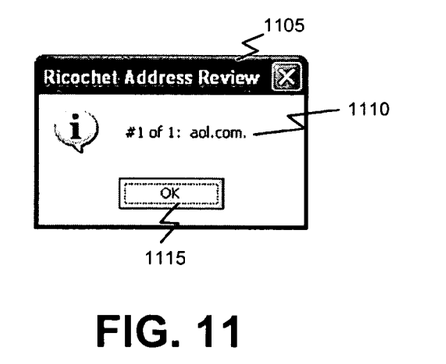
FIG. 11 illustrates an exemplary user interface for providing details of recipient addresses of an email according to one embodiment of the present invention.

FIG. 11 illustrates an exemplary user interface for providing details of recipient addresses of an email according to one embodiment of the present invention. In this example, the interface comprises dialog box 1105 or other element that can be presented, for example, as a pop-up window or other graphical display element when the user elects to review the identified information, e.g., presses the "OK" button 1115. As illustrated here, the dialog box 1105 can include a message 1110 indicating the information identified, e.g., the recipients domain, and a button 1115 or other element for acknowledging the information and possibly advancing to another, next identified piece of information, if more than one is found.

Figure 12:
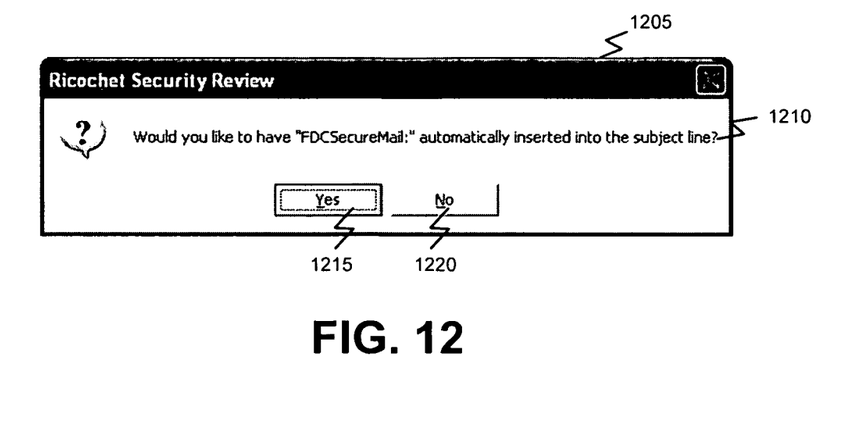
FIG. 12 illustrates an exemplary user interface for an encryption request according to one embodiment of the present invention.

FIG. 12 illustrates an exemplary user interface for an encryption request according to one embodiment of the present invention. In this example, the interface comprises dialog box 1205 or other element that can be presented, for example, as a pop-up window or other graphical display element when the filter determines encryption is appropriate for an outbound email. The dialog box 1205 can include a message 1210 indicating that encryption is applied and providing the user with an option to add an indication of such to the subject line of the email. The dialog box 1205 can also include a button 1215 or other element for accepting the option to add the indication and/or a button 1220 or other element for declining the option.

Figure 13:
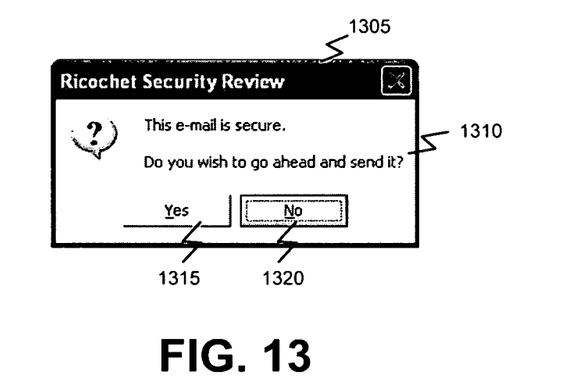
FIG. 13 illustrates an exemplary user interface for email submission confirmation according to one embodiment of the present invention.

FIG. 13 illustrates an exemplary user interface for email submission confirmation according to one embodiment of the present invention. In this example, the interface comprises dialog box 1305 or other element that can be presented, for example, as a pop-up window or other graphical display element when the filter determines an outbound email is secure and/or ready to be sent. The dialog box 1305 can include a message 1310 indicating the email is ready to be sent and providing the user with an option to send the email message. The dialog box 1305 can also include a button 1315 or other element for accepting the option to send the message and/or a button 1320 or other element for declining the option, i.e., canceling the email message.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing client-based filtering of outgoing email content, the method comprising:
  detecting, by a computer system, an outbound email with a filter implemented on an email client application;
  determining, by the computer system, with the filter whether the outbound email is addressed to a recipient outside of an organization;
  in response to determining the outbound email is addressed to an internal recipient within the organization, allowing the email to be sent without scanning content of the email; and
  in response to determining the outbound email is addressed to an external recipient outside of the organization, determining, by the computer system, using the filter whether to allow the email to be sent, wherein:

the filter is used to determine:
whether a length of a string of digits within the content of the email relates to protected information;
whether one or more formatting characters within the string of digits relate to protected information;
whether the string of digits comprises specific beginning digits; and
whether the string of digits is a routing transit number that corresponds to a stored routing transit number in a database accessible by the computer system.

2. The method of claim 1, wherein determining whether to allow the email to be sent comprises:
scanning the content of the email; and
determining whether the content of the email contains protected information.

3. The method of claim 2, wherein scanning the content of the email further comprises scanning one or more attachments to the email.

4. The method of claim 2, further comprising, in response to determining the email contains protected information, determining whether the recipient is eligible to receive the protected information.

5. The method of claim 4, further comprising, in response to determining the recipient is not eligible to receive the protected information, blocking the email with the filter.

6. The method of claim 4, further comprising, in response to determining the recipient is eligible to receive the protected information, determining whether encryption of the protected information is required.

7. The method of claim 6, further comprising, in response to determining encryption of the protected information is required, determining whether the protected information is encrypted.

8. The method of claim 7, further comprising, in response to determining the protected information is not encrypted, blocking the email with the filter.

9. The method of claim 1, further comprising, in response to determining to not allow the email to be sent, providing a notification that the email cannot be sent, the notification explaining reasons for determining to not allow the email to be sent.

10. The method of claim 1, further comprising, in response to determining to not allow the email to be sent, logging information related to the email.

11. The method of claim 1, further comprising, in response to determining to not allow the email to be sent, reporting information related to the email.

12. The method of claim 1, wherein the filter is further used to determine:
whether a personal account number is present within the content of the email that corresponds to a stored personal account number in a database accessible by the computer system.

13. The method of claim 1, wherein the filter is further used to determine:
whether the string of digits passes a base 10 check digit routine.

14. The method of claim 1, wherein the filter that is used to determine whether the length of the string of digits within the content of the email relates to protected information comprises: the filter being used to determine whether the string of digits is at least a minimum number of digits and is at most a maximum number of digits.

15. A system comprising:
a processor executing an email client application; and
a non-transitory memory coupled with and readable by the processor, the memory having stored therein instructions comprising an email filter which, when executed by the processor, cause the processor to:
detect an outbound email of the email client application, the email client application having a filter implemented;
determine whether the outbound email is addressed to a recipient outside of an organization;
in response to determining the outbound email is addressed to an internal recipient within the organization, allowing the email to be sent without scanning content of the email; and
in response to determining the outbound email is addressed to an external recipient outside of the organization, determine, using the email filter, whether to allow the email to be sent, wherein the email filter is used to determine whether to allow the email to be sent, wherein the filter is used to determine:
whether one or more formatting characters within the string of digits relate to protected information;
whether the string of digits is a routing transit number that corresponds to a stored routing transit number in a database accessible by the computer system;
whether a length of a string of digits within the content of the email relates to protected information; and
whether the string of digits comprises specific beginning digits.

16. The system of claim 15, wherein determining whether to allow the email to be sent comprises:
scanning the content of the email; and
determining whether the content of the email contains protected information.

17. The system of claim 16, wherein scanning the content of the email further comprises scanning one or more attachments to the email.

18. The system of claim 16, further comprising, in response to determining the email contains protected information, determining whether the recipient is eligible to receive the protected information.

19. The system of claim 18, further comprising, in response to determining the recipient is not eligible to receive the protected information, blocking the email with the filter.

20. The system of claim 18, further comprising, in response to determining the recipient is eligible to receive the protected information, determining whether encryption of the protected information is required.

21. The system of claim 20, further comprising, in response to determining encryption of the protected information is required, determining whether the protected information is encrypted.

22. The system of claim 15, further comprising, in response to determining to not allow the email to be sent, providing a notification that the email cannot be sent, the notification explaining reasons for determining to not allow the email to be sent.

23. A non-transitory machine-readable medium having stored thereon a series of instructions which, when executed by a processor, cause the processor to provide client-based filtering of outgoing email content by:
detecting an outbound email with a filter implemented on an email client application;
determining with the filter whether the outbound email is addressed to a recipient outside of an organization;
in response to determining the outbound email is addressed to an internal recipient within the organization, allowing the email to be sent without scanning content of the email; and in response to determining the outbound email is addressed to a recipient outside of the organization, determining with the filter whether to allow the email to be sent, wherein the filter determines:

whether the string of digits comprises specific beginning digits;

whether one or more formatting characters within the string of digits relate to protected information;

whether a length of a string of digits within the content of the email relates to protected information; and whether the string of digits is a routing transit number that corresponds to a stored routing transit number in a database accessible by the computer system.

* * * * *